United States Patent [19]

Knipp et al.

[11] Patent Number: 5,348,778
[45] Date of Patent: Sep. 20, 1994

[54] SANDWICH ELEMENTS IN THE FORM OF SLABS, SHELLS AND THE LIKE

[75] Inventors: Ulrich Knipp, Bergisch; Dieter Skoupi, Lindlar, both of Fed. Rep. of Germany

[73] Assignee: Bayer Aktiengesellschaft, Leverkusen, Fed. Rep. of Germany

[21] Appl. No.: 143,279

[22] Filed: Oct. 12, 1993

Related U.S. Application Data

[63] Continuation-in-part of Ser. No. 864,117, Apr. 6, 1992, abandoned.

[30] Foreign Application Priority Data

Apr. 12, 1991 [DE] Fed. Rep. of Germany ....... 4111909
Jul. 4, 1991 [DE] Fed. Rep. of Germany ....... 4122099

[51] Int. Cl.$^5$ .................... B32B 1/08; B65D 90/02; E04B 2/32; E04C 2/34; E04C 2/38
[52] U.S. Cl. .................... 428/35.8; 52/309.9; 52/309.11; 52/578; 52/588.1; 52/806; 52/817; 220/445; 312/400; 312/401; 428/36.5; 428/36.91; 428/53; 428/58; 428/71; 428/192; 428/318.6; 428/319.3
[58] Field of Search .............. 428/35.8, 36.5, 53, 428/71, 192, 318.6, 319.3, 36.91, 58; 52/304.9, 309.11, 578, 586, 588, 806, 817

[56] References Cited

U.S. PATENT DOCUMENTS

| 3,564,801 | 2/1971 | Hulrta | 52/588 |
| 4,350,734 | 9/1982 | Hammond | 428/308.4 |
| 4,425,740 | 1/1984 | Golden | 52/81 |
| 4,485,801 | 6/1984 | Merritt | 52/309.9 |
| 4,744,185 | 8/1988 | Lamberet et al. | 52/309.1 |
| 5,097,643 | 3/1992 | Wittler | 52/238.1 |

FOREIGN PATENT DOCUMENTS

| 310818 | 4/1989 | European Pat. Off. . |
| 78/37388 | 4/1979 | Fed. Rep. of Germany . |
| 2935259 | 3/1980 | Fed. Rep. of Germany . |
| 3228645 | 2/1984 | Fed. Rep. of Germany . |
| 1800773 | 7/1986 | Fed. Rep. of Germany . |
| 2551886 | 5/2677 | Fed. Rep. of Germany . |
| 2279547 | 3/1976 | France . |
| 1512239 | 5/1978 | United Kingdom . |

OTHER PUBLICATIONS

Abstract of F.R.G. 2,551,886 (May 26, 1977).
Abstract of F.R.G. 1,800,773 Jul. 16, 1986.

*Primary Examiner*—James C. Cannon
*Attorney, Agent, or Firm*—Joseph C. Gil

[57] ABSTRACT

Sandwich elements in the form of slabs, shells and the like, consisting of facings and a rigid polyurethane foam core can be joined together in an airtight and watertight manner when they are provided with edge profiles which are cast from casting materials forming flexible polyurethane foam and which have a groove and a tongue.

8 Claims, 2 Drawing Sheets

SANDWICH ELEMENTS IN THE FORM OF SLABS, SHELLS AND THE LIKE

This application is a continuation-in-part of U.S. application Ser. No. 07/864,117, filed on Apr. 6, 1992, now abandoned.

BACKGROUND OF THE INVENTION

The present invention relates to a sandwich element in the form of a slab, shell and the like. The element consisting of facings and a rigid polyurethane foam core based on polyisocyanate, and of edge profiles.

Sandwich elements which are intended to be separably or permanently joined together have problems associated with the airtight and watertight sealing of the joints because of the supporting facings made of aluminum foil, sheet steel, plastic film or composite paper. Conventional bonding with profiles made of suitable materials, such as wood, metal or plastic, is expensive and, because of the low strength of the foam core, very sensitive to impact. Internal stresses result in rapid loosening of the joint between the actual sandwich element and the edge profile. In addition, distortion may occur due to the internal stresses. Differences in coefficients of thermal expansion of the various materials also cause cracking.

The object of the present invention is to provide sandwich elements, which have an optimum stability, with joining means which are airtight, watertight and durable as well as free from distortion and cracking.

DESCRIPTION OF THE INVENTION

Figure 1:
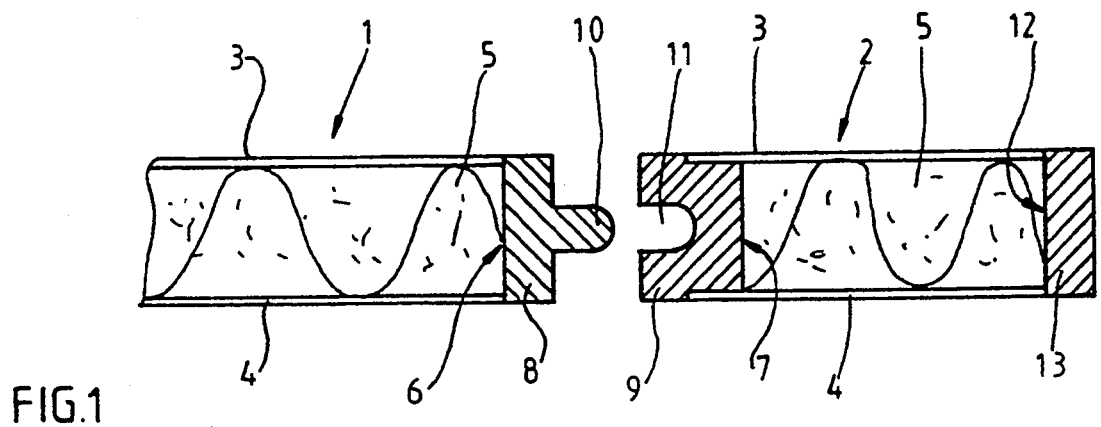
FIG. 1 shows sandwich elements with a first embodiment of a joint according to the present invention.

The above noted object is achieved if the edge profiles are cast from flexible polyurethane foam-forming materials and if the profiles are of the tongue-and-groove type. The profiles are directly cast to the foam core. The surface of the cast flexible-foam tongue profiles adhere to the surface of the corresponding cast flexible-foam groove profiles due to the pores (or micropores) on the surface of the respective profiles which act like thousands of suction cups. Neither adhesives nor mechanical anchors of any type are required.

The sandwich elements can be produced by known processes, either continuously (for example, on a double conveyor belt), or batchwise (for example, in molds). If the edge profiles cannot be cast at the same time, they are cast in a separate process step by placing the elements in an appropriate mold, in which the edge profiles are then cast. It has been found, surprisingly, that flexible polyurethane foam meets the requirements, which could not have been anticipated.

The novel sandwich elements can be used for a very wide variety of purposes according to their shape: in the building sector as wall panels, roofing panels, ducts for conveying air in air conditioning technology, insulation for pipe conduits, louvre boxes, lining boards and door leaves; in the vehicle sector as walls, especially partitions for private cars, buses and lorry bodies; and, in the furniture sector for stable box furniture, domestic refrigerators and drawers, and as plug-connections. They can also be used as stable lightweight troughs, for example large troughs in repair workshops for holding oil, and transport containers for foodstuffs. They can be used to particular advantage as collapsible containers, for example for rail and air freight.

For many purposes, it is sufficient simply to fit the elements together. For permanent joints, it is preferable to use adhesives based on epoxy resin, polyurethane or polychloroprene rubber or to use tongue-and-groove joints with undercuts.

The generally known tongue-and-groove forms can also be used in this case. Since it is desired to achieve airtightness and watertightness, there must be a certain fitting accuracy as the elasticity of flexible polyurethane foam cannot compensate for all unevenness's sufficiently to form a seal.

A particularly good seal is achieved if the edge profiles consist of unfilled polyurethane foam with a Shore A hardness of less than 98 and preferably of between 60 and 90.

According to another particular embodiment, the edge profiles with a groove, on the one hand, and the edge profiles with a tongue, on the other, consist of polyurethane foams with different Shore A hardnesses. The gradation in hardness or softness has the advantage that one edge profile is somewhat more rigid than the other and thus imparts greater stability to the joint, while the softer edge profile predominantly takes over the sealing function.

Edge profiles made of filler-enriched polyurethane foams having a coefficient of thermal expansion of $<60\times10^{-6}/°C$. are particularly resistant to distortion.

If the sandwich elements are provided with edge profiles on the long sides only, the fronts have bevels which are filled up by the edge profile. This measure gives a greater strength and a better seal and affords enhanced protection to the corner regions, which are often especially at risk.

A particularly good joint between the edge profiles and the actual sandwich element can be achieved if the facings project beyond the rigid foam core and the corresponding space is filled up by the edge profiles. This construction permits surface adhesion between the facings and the edge profiles and makes it possible to achieve particularly high edge rigidities and joint strengths.

The novel sandwich element and the joining of such sandwich elements are shown purely schematically in section in several embodiments in the drawings.

In FIG. 1, the sandwich elements 1 and 2 consist of sheet steel facings 3 and 4 which enclose between them a rigid polyurethane foam core 5. The edges 6 and 7 are provided with cast polyurethane foam edge profiles 8 and 9. In sandwich element 2, the facings 3 and 4 project beyond the rigid polyurethane foam core 5 so that the edge profile 9 fills up this space between the facings 3 and 4. Molded on to the edge profile 8 is a tongue 10 which fits in an airtight and watertight manner into a corresponding groove 11 in the edge profile 9. An end profile 13 is cast on to the edge 12. The edge profiles 8 and 9 and the end profile 13 were cast in an appropriate mold in which the sandwich elements I and 2 were placed. The material used was a polyurethane foam casting material which forms a flexible untilled polyurethane with a Shore A hardness of 80 and has a coefficient of thermal expansion of $120 \times 10^{-6}/°$ C. The fit between the tongue 10 and the groove 11 is chosen so as to produce a tight contact.

Figure 2:
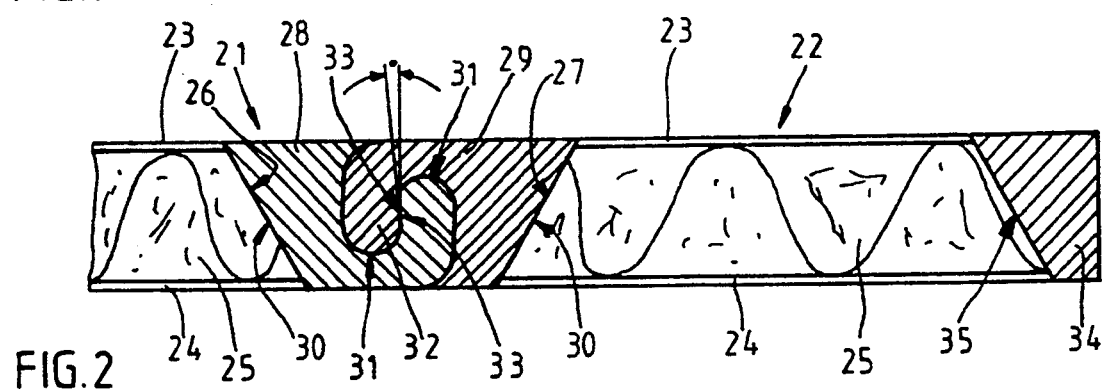
FIG. 2 shows sandwich elements with a second embodiment of the joint according to the present invention.

In FIG. 2, the sandwich elements 21 and 22 consist of aluminum foil facings 23 and 24 which enclose between them a rigid polyurethane foam core 25. Their edges 26 and 27 are provided with cast polyurethane foam edge profiles 28 and 29. There are bevels 30 as interfaces between the slab-like sandwich elements 21 and 22 and the cast edge profiles 28 and 29. A groove 31 and a tongue 32 are present on each edge profile 28 and 29. They interlock like hooks and have an undercut 33 forming an angle of 10° to the vertical. The sandwich element 22 is provided with an end profile 34 which again has a bevel 35 with the actual sandwich element 22. The same polyurethane casting material was chosen for the edge profiles 28 and 29 and the end profile 34 as for the embodiment according to FIG. 1.

Figure 3:
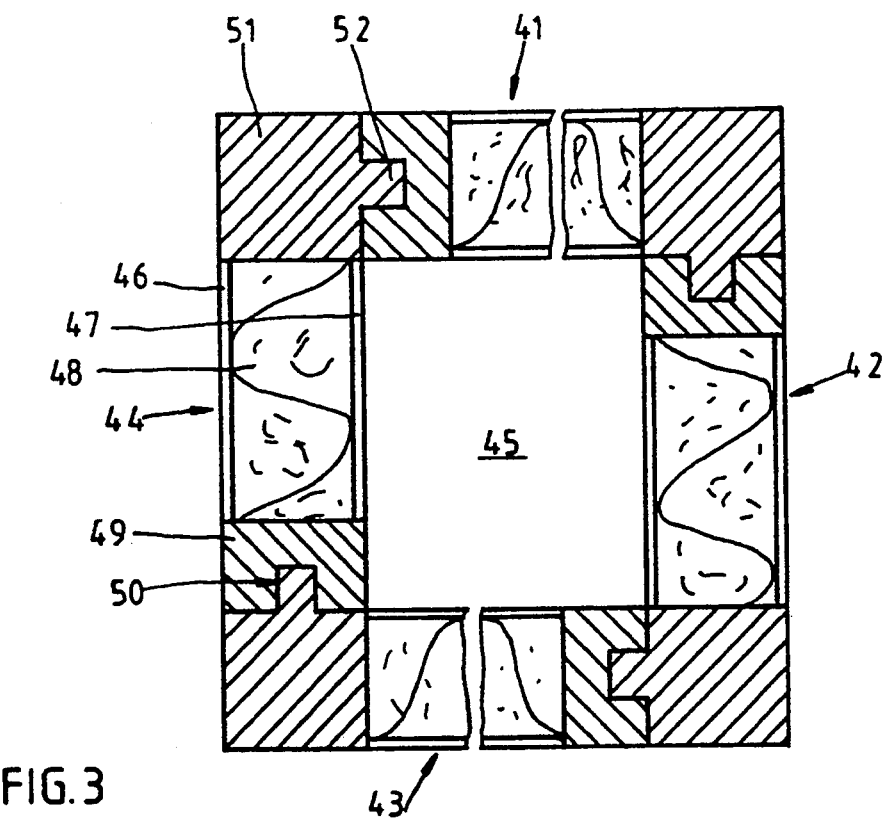
FIG. 3 shows sandwich elements fitted together to form a duct.

In FIG. 3, four sandwich elements 41, 42, 43 and 44 are arranged in a rectangle so as to enclose a duct 45. Each element consists of plastic facings 46 and 47 with a rigid polyurethane foam core 48 between them. Foam edge profiles 49 with grooves 50, on the one hand, and foam edge profiles 51 with tongues 52, on the other, are cast on to the sandwich elements 41, 42, 43 and 44. The groove 50 and the tongue 52 of each sandwich element 41, 42, 43 and 44 is arranged in mutually perpendicular planes in order to form the rectangular shape. In this case the polyurethane foam of the edge profiles 49 has a Shore A hardness of 60, while that of the edge profiles 51 has a Shore A hardness of 80.

Figure 4:
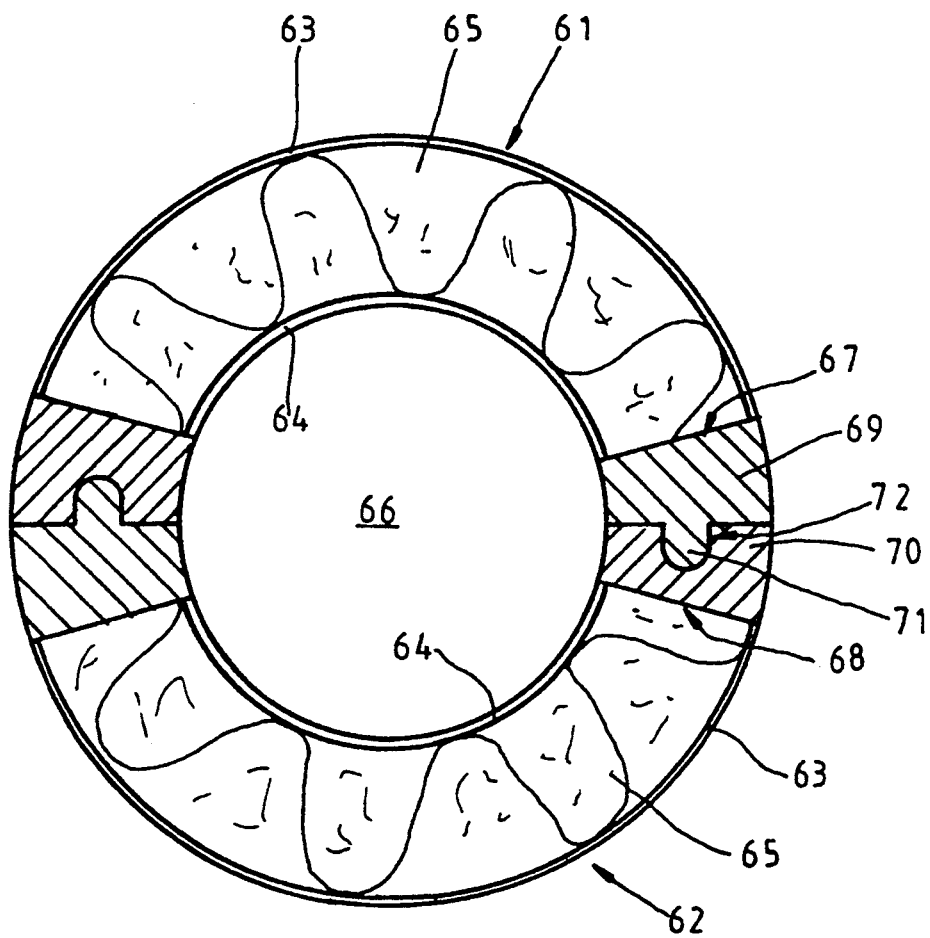
FIG. 4 shows sandwich elements in the form of assembled insulating half-shells for pipe conduits.

FIG. 4 shows sandwich elements 61 and 62 in the form of half-shells for pipe conduit insulation. Each element consists of facings 63 and 64 which enclose a rigid polyurethane foam core 65. The long edges 67 and 68 are provided with cast foam edge profiles 69 and 70, between which the edge profiles 69 each have a tongue 71 and the edge profiles 70 each have a groove 72, The edge profiles 69 and 70 here are permanently bonded with an adhesive. The material used for the edge profiles 69 and 70 was a polyurethane foam casting material filled with 40% of milled glass fibers and having a coefficient of thermal expansion of $60 \times 10^{-6}/°$ C.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A sandwich element comprising a rigid polyurethane foam core having sides and edges, facings covering said sides and edge profiles covering said edges, wherein said edge profiles are cast directly onto said edges from flexible polyurethane foam-forming materials and wherein said profiles have grooves and tongues.

2. The sandwich element of claim 1, wherein said edge profiles consist of unfilled polyurethane foam with a Shore A hardness of less than 98.

3. The sandwich element of claim 2, wherein said edge profiles consist of unfilled polyurethane foam with a Shore A hardness of between 60 and 90.

4. The sandwich element of claim 1, wherein one of said edge profiles is provided with a groove, and the opposite edge profile is provided with a tongue, and wherein each profile consists of a polyurethane foam with a different Shore A hardness.

5. The sandwich element of claim 1, wherein said edge profiles consist of filler-enriched polyurethane foam which has a coefficient of thermal expansion of $<60 \times 10^{-6}/°$ C.

6. The sandwich element of claim 1, wherein said sandwich is provided with bevels which are filled up by the edge profile.

7. The sandwich element of claim 1, wherein said facings project beyond the rigid foam core and wherein the corresponding space is filled up by said edge profile.

8. The sandwich element of claim 1, wherein the groove and/or the tongue are provided with undercuts.

* * * * *

UNITED STATES PATENT AND TRADEMARK OFFICE
CERTIFICATE OF CORRECTION

PATENT NO. : 5,348,778
DATED : September 20, 1994
INVENTOR(S) : Ulrich Knipp et al It is certified that error appears in the above-indentified patent and that said Letters Patent is hereby corrected as shown below:

At line item [22], delete: "Filed: October 12, 1993" and insert --Filed: October 26, 1993--.

At column 2, line 54, delete "sandwich elements I and 2" and insert --sandwich elements 1 and 2--.

At column 2, line 66, delete "sandwich elements I and 2" and insert --sandwich elements 1 and 2--.

At column 2, line 68, delete "a flexible untilled" and insert --a flexible unfilled--.

UNITED STATES PATENT AND TRADEMARK OFFICE
CERTIFICATE OF CORRECTION

PATENT NO. : 5,348,778
DATED : September 20, 1994
INVENTOR(S) : Ulrich Knipp et al It is certified that error appears in the above-indentified patent and that said Letters Patent is hereby corrected as shown below:

Col 4, line 18,
In Claim 2, line 2, delete "consist of untilled polyurethane" and
  insert --consist of unfilled polyurethane--.

Col 4, line 21,
In Claim 3, line 2, delete "consist of untilled polyurethane" and insert
  --consist of unfilled polyurethane--.

Signed and Sealed this

Twenty-fourth Day of January, 1995

Attest:

BRUCE LEHMAN

Attesting Officer     Commissioner of Patents and Trademarks